G. C. KIMMEL.
GRINDING MACHINE.
APPLICATION FILED NOV. 9, 1918.
1,337,140.
Patented Apr. 13, 1920.
2 SHEETS—SHEET 1.
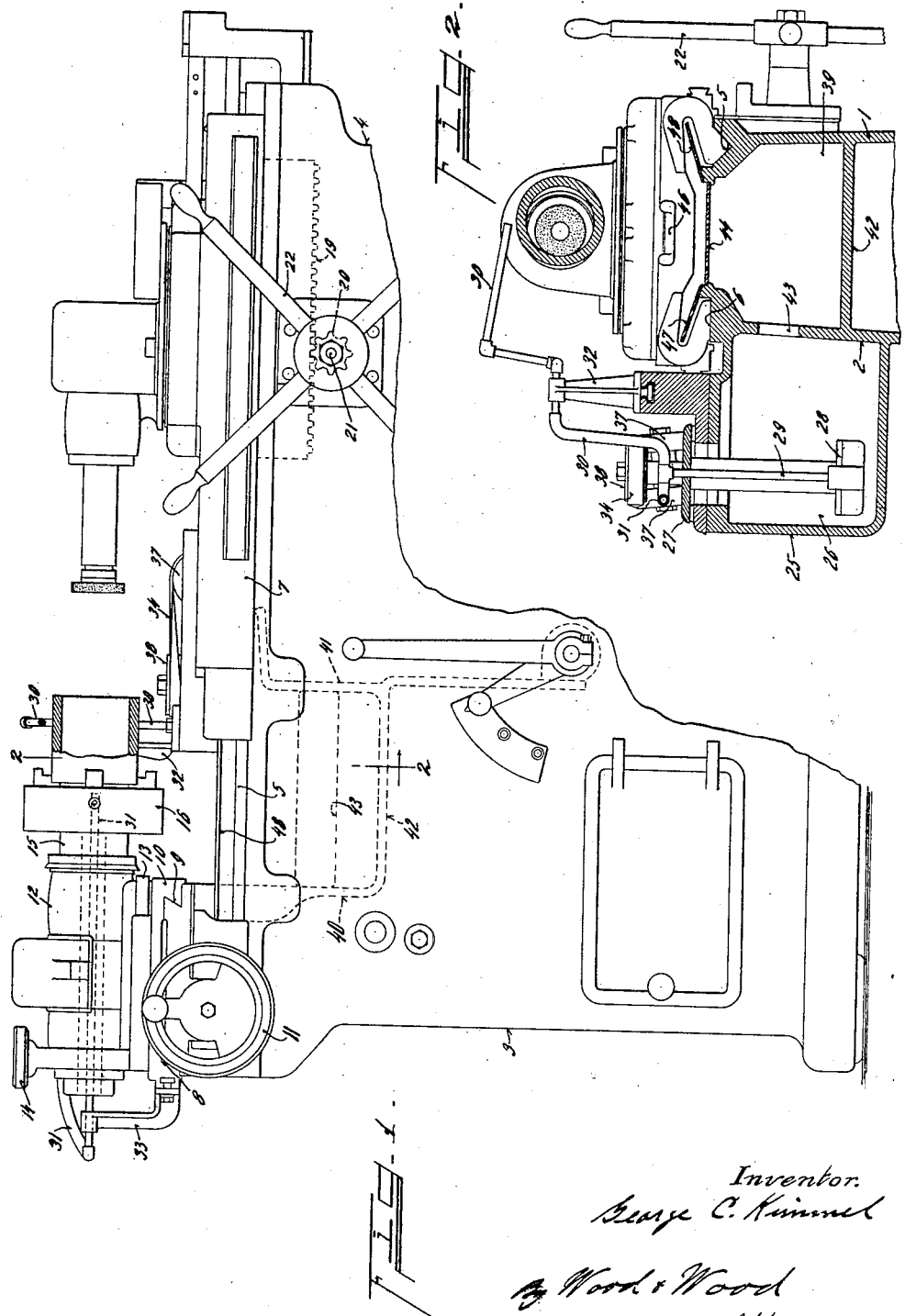
Inventor.
George C. Kimmel
By Wood & Wood
Attorneys.

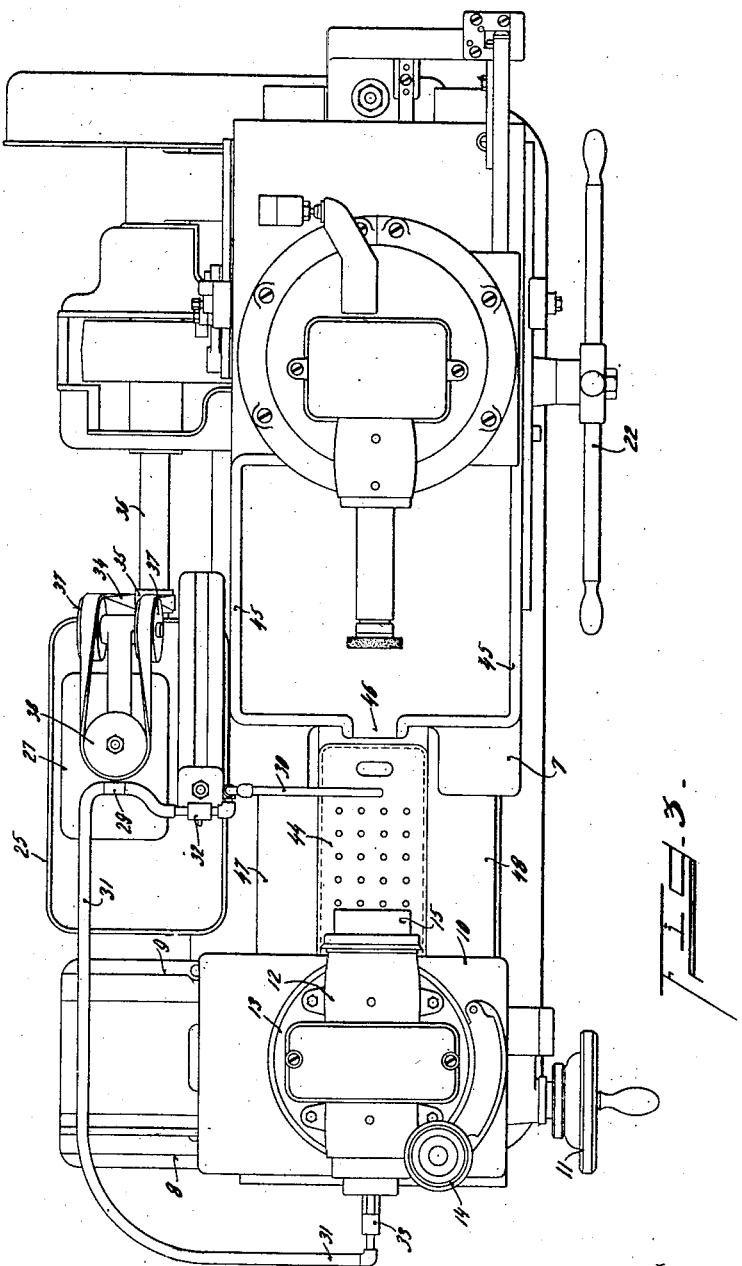

UNITED STATES PATENT OFFICE.

GEORGE C. KIMMEL, OF CINCINNATI, OHIO, ASSIGNOR TO THE CINCINNATI GRINDER COMPANY, OF CINCINNATI, OHIO, A CORPORATION OF OHIO.

GRINDING-MACHINE.

1,337,140.  Specification of Letters Patent.  Patented Apr. 13, 1920.

Application filed November 9, 1918. Serial No. 261.790.

*To all whom it may concern:*

Be it known that I, GEORGE C. KIMMEL, a citizen of the United States, and residing at Cincinnati, in the county of Hamilton and State of Ohio, have invented a new and useful Improvement in Grinding-Machines, of which the following specification is a full disclosure.

My invention relates to a grinding machine and is more particularly directed to that type known in the art as an "internal cylinder grinder."

One of the objects of the invention is to provide a circulating work lubricating system with the circulation maintained by a power driven pump, from a supply reservoir to the work, and to provide a settling reservoir into which the liquid coolant drains, the settling reservoir having an overflow communicating with the supply reservoir.

Another object is to provide a machine having a tool carriage mounted to slide on parallel ways, the ways being protected by cover plates inclined inwardly and downwardly to act as drain sheds entraining the liquid coolant from the work downwardly and inwardly between the ways.

While I have shown this mechanism as applied to a grinding machine, it is obvious that any form of rotary tool or cutter may be substituted for the grinding wheel.

The features of the invention are more fully set forth in the description of the accompanying drawings, forming a part of this specification, in which:

Figure 1 is a front elevation showing the supply reservoir in dotted lines.

Fig. 2 is a detail transverse section on line 2, 2, Fig. 1.

Fig. 3 is a top plan view.

The main elements of the machine comprise a frame, an adjustable head-stock and a tool carriage carrying a turn-table toolhead. The frame consists of a front wall 1, a back wall 2 and end walls 3, 4, forming a box-like structure inclosing and supporting the various drive and speed change elements which may be of any preferred form and which are not herein illustrated or described in detail.

The upper surfaces of the front and back walls 1, 2, form ways 5, 6, upon which the tool-carriage 7 slides, the way 5 being of V-formation and the way 6 of table formation. The head-stock end of the frame is provided with transverse ways 8, 9, upon which slides a head-stock carriage 10. This head-stock carriage is translated by a hand wheel 11, through any suitable feed screw mechanism and the head-stock 12 is carried on a rotatable plate 13, adapted to be adjusted by a hand wheel 14 to aline the hollow head-stock spindle 15 parallel with the main slide-ways 5, 6, for straight grinding or at an angle thereto for taper grinding. The head-stock spindle may be provided with a suitable chuck 16 for supporting the work and is driven by any suitable form of drive mechanism.

The present invention is not directed to any specific forms of head-stock or tool carriage mechanism, therefore only such illustration and description thereof is herein presented as will promote a thorough understanding of the general operation of the machine.

The tool carriage 7 slides upon the ways 5, 6, and has secured to its under surface a feed rack 19 meshing with a pinion 20, which is fixed to the inner end of a shaft 21. The shaft 21 is journaled in the front wall 1 and is provided at its outer end with a normally operated hand wheel 22.

The circulating system for the liquid coolant comprises a supply reservoir casing 25 projecting from the back frame wall 2 and forming therewith a supply reservoir 26 having a cover plate 27. Supported on the cover plate 27 and depending into the supply reservoir is a centrifugal pump 28 having a discharge conduit 29, extended upwardly through said cover and connecting with the distributing conduits 30, 31. The conduit 30 is supported in a bracket 32 adjustably attached to the cover plate 27 and conveys and directs the cooling liquid upon the exterior surface of the work. The conduit 31 is supported in a bracket 33 adjustably attached to the head-stock carriage 10 and extends through the hollow head-stock spindle 15, conveying the lubricant to flow on the interior surface of the work.

The pump 28 is driven by a belt 34 engaging a belt pulley 35 on a power shaft 36 and entrained over a pair of guide pulleys 37, 37, and around a pulley 38 fixed to the pump shaft.

Within the interior of the main frame adjacent the supply reservoir 26, I provide a settling basin 39 formed by the front and back frame walls 1 and 2 and by partition walls 40, 41, 42. An overflow aperture 43 leading into the supply reservoir 26 is formed in the back wall 2, and supported near the top of the frame over the settling basin is a strainer plate 44. The forward end of the tool carriage 7 is provided with a marginal wall 45, terminating at a drain spout 46, and the upper surface slopes toward said spout to drain the cooling liquid into the settling basin.

In machines of this character, it is desirable that some means be provided for protecting the main slide-ways 5, 6, from injury by grinding or otherwise, and in the present invention I have provided inwardly and downwardly inclined cover plates 48, 48, extended the full length of the ways. These plates are secured to the front and back frame walls 1, 2, and are of sufficient width to fully cover their respective slide-ways, serving also to entrain the cooling liquid into the settling basin 39.

Having described my invention, I claim:

1. In a machine of the class described, a frame, having walls providing a pair of parallel rails and a reservoir between the rails and below the heads of the rails, oppositely inclined guards covering the rail heads respectively and providing a drainage to the reservoir, a carriage straddling said rails, having supporting members overhanging said guards, bearing, and translatable upon said rails, a second reservoir communicating with said first reservoir at a point above the base thereof, and a pump and pipe connection for conveying liquid from said second reservoir to a point of utilization above said guards.

2. In a machine of the class described, a frame, having walls providing a pair of parallel rails and a reservoir between the rails and below the heads of the rails, a strainer plate connecting with said rails covering said reservoir, oppositely inclined guards covering the rail heads respectively and providing a drainage to the reservoir, a carriage straddling said rails, having supporting members overhanging said guards, bearing, and translatable upon said rails, a second reservoir communicating with said first reservoir at a point above the base thereof, and a pump and pipe connection for conveying the liquid from said second reservoir to a point of utilization above said guards.

3. In a machine of the class described, a frame, having walls providing a pair of parallel rails and a reservoir between the rails, oppositely inclined guards longitudinally covering the heads of the rails respectively and providing drainage to the reservoir, a carriage straddling said rails, having supporting members overhanging said guards, bearing and translatable upon said rails.

4. In a machine of the class described, a frame, having walls providing a pair of parallel rails and a reservoir between the rails, oppositely inclined guards fixed to and longitudinally covering the heads of the rails respectively and providing drainage to the reservoir, a carriage straddling said rails, having rail engaging gibs extending beyond the opposite ends of the carriage, the gibs yoking around said guards and translatable upon said rails and having their upper surface above the guards inclined downwardly toward the reservoir, a second reservoir communicating with said first reservoir at a point above the base of said first reservoir, and a pump and pipe connection for conveying liquid from said second reservoir to a point of utilization above said guards.

In witness whereof I hereunto subscribe my name, as attested by the two subscribing witnesses.

GEORGE C. KIMMEL.

Witnesses:
 CLARENCE B. FOSTER,
 LOUISE A. BECK.